(12) United States Patent
Dye

(10) Patent No.: US 7,162,406 B1
(45) Date of Patent: *Jan. 9, 2007

(54) CONTROL PROGRAM FOR EXECUTING, VIEWING AND EDITING ANOTHER PROGRAM THAT SIMULATES OPERATOR ACTIONS

(75) Inventor: Douglas Patrick Dye, Murrieta, CA (US)

(73) Assignee: Unisys Corporation, Blue Bell, PA (US)

( * ) Notice: Subject to any disclaimer, the term of this patent is extended or adjusted under 35 U.S.C. 154(b) by 788 days.

This patent is subject to a terminal disclaimer.

(21) Appl. No.: 10/339,716

(22) Filed: Jan. 8, 2003

(51) Int. Cl.
*G06F 9/44* (2006.01)
*G06F 11/00* (2006.01)
*G06G 7/48* (2006.01)
*G01M 19/00* (2006.01)

(52) U.S. Cl. .............. 703/21; 703/6; 702/122; 714/46

(58) Field of Classification Search .......... 703/6, 703/21; 714/25, 46; 716/4; 702/108, 122
See application file for complete search history.

(56) References Cited

U.S. PATENT DOCUMENTS

| | | | | |
|---|---|---|---|---|
| 5,021,997 A | * | 6/1991 | Archie et al. | 714/31 |
| 5,602,990 A | * | 2/1997 | Leete | 714/46 |
| 5,896,494 A | * | 4/1999 | Perugini et al. | 714/27 |
| 6,029,257 A | * | 2/2000 | Palmer | 714/40 |
| 6,463,552 B1 | * | 10/2002 | Jibbe | 714/33 |
| 6,807,506 B1 | * | 10/2004 | Sutton et al. | 702/123 |
| 2002/0032559 A1 | * | 3/2002 | Hellestrand et al. | 703/22 |
| 2003/0120472 A1 | * | 6/2003 | Lind | 703/13 |

OTHER PUBLICATIONS

Jones, W. B., Assembly Language for the IBM PC Family, 2nd ed. El Granada, CA: Scott/Jones Inc., 1997. ISBN 1-57676-001-4., p. 45-46, 75-95, 131-137, 189-210, 399-407, 667-672.*

* cited by examiner

*Primary Examiner*—Zoila Cabrera
*Assistant Examiner*—Eun H Chung
(74) *Attorney, Agent, or Firm*—Charles J. Fassbende; Mark T. Starr

(57) ABSTRACT

A control program controls various operations in a simulated operator program. In particular, the control program: a) sequentially executes commands in the simulated operator program; b) displays, on a monitor, each particular command that is currently being executed; c) slows the execution of the commands to a rate where each displayed command can be viewed and recognized by an operator; d) provides control mechanisms for manually stopping the simulated operator program immediately after the displayed particular command is completely executed; e) provides control mechanisms for editing and restarting the simulated operator program at any selected command.

15 Claims, 9 Drawing Sheets

CONTROL PROGRAM FOR EXECUTING, VIEWING AND EDITING ANOTHER PROGRAM THAT SIMULATES OPERATOR ACTIONS

RELATED CASES

The invention which is claimed herein is related to a second invention that is entitled "SYSTEM FOR TESTING THE HARDWARE OF A DIGITAL COMPUTER BY EXECUTING, VIEWING, AND EDITING A SIMULATED OPERATOR PROGRAM" Ser. No. 10/339,717. Patent applications on both of these inventions were filed concurrently on Jan. 8, 2003, and they have the same Detailed Description.

BACKGROUND OF THE INVENTION

The invention which is claimed herein relates to control programs which execute commands, in a simulated operator program, that simulate input signals to a computer from a manual input device such as a mouse or a keyboard. More particularly, the invention which is claimed herein relates to control programs which not only execute the commands in a simulated operator program, but in addition, enable those commands to be—a) visually monitored as they are executed, b) stopped at any point in response to what the visual monitoring shows, c) edited while their execution is stopped, and d) restarted at any selectable point after the editing occurs.

An example of one particular use of the control program which is structured in accordance with the present invention is in systems that test the hardware of a digital computer. As us herein, the term "hardware of a digital computer" means the electronic circuits which are in the computer. By comparison, the term "software" means any program of computer commands that is stored in a memory and is executed by the computer hardware.

In the prior art, a common method by which the manufacturer of a digital computer tested the computer's hardware was as follows. Initially, a hardware test program for the computer was written which performed many different tests. The hardware test program usually provided a test program image on a monitor by which an operator would interact with the hardware test program. For example, the test program image would enable an operator to use manual input devices (such as a keyboard and a mouse) to select a particular test and enter selectable test parameters, such a selectable voltage margin or selectable operating temperature.

After the hardware test program was written, it was loaded into a test terminal that was coupled to the computer whose hardware needed to be tested. Next, the operator of the test terminal used manual input devices to manually select a particular test and particular test parameters. Then, the operator started the selected test; and in response, the selected test sent electronic test input signals to the computer hardware and received electronic test output signals back from the computer hardware.

Then the hardware test program would compare the received test output signals to predetermined output signals, and the results would be shown in the test program image on the monitor. If the displayed results indicated that a particular hardware error occurred, the operator would replace a corresponding hardware module in the computer. Thereafter, the operator would use the input devices and the test program image to direct the test program to rerun the same test. Conversely, if the displayed test results indicated that no hardware error occurred, then the operator would use the input devices and test program image to select and run another test in the test program.

One particular problem with the above prior art testing method is that as the hardware of the digital computer grows in complexity, the complexity of how the operator must interact with the test program also grows. As a specific example, the hardware of an ES7000 computer (which is made and sold by Unisys Corporation) includes—a) several instruction processors that operate in parallel, b) more than a gigabyte of semiconductor memory, and c) multiple custom integrated circuit chips which intercouple the instruction processors to the memory. All of this computer hardware is implemented with over one billion transistors; and consequently, the hardware test program is so complex that the operator of the test program is provided with a large instruction manual which lists hundreds of steps on how to interact with the test program via the mouse, keyboard, and test program image.

Attached hereto as Appendix A are some representative pages from the above instruction manual. Step "iii" in section "k" on page 36 of the manual is an example of where the operator clicks the mouse on a particular item that is displayed in the test program image on the monitor. Step "i" in section "m" on page 36 of the manual is an example of where the operator types a particular entry, via the keyboard, in the test program image. Step "iv" in section "r" on page 36 of the manual is an example of where the operator looks for a particular graphic response, in the test program image on the monitor.

To train an operator to understand and perform the hundreds of the steps which are in the above instruction manual, is both time consuming and expensive. Also, to actually test a single ES7000 computer by running and interacting with the test program, as specified in the instruction manual, is a tedious process which is prone to human error.

Therefore, in order to avoid having an operator perform all of the steps which are listed in the above instruction manual, one aspect of the present invention is to provide a simulated operator program which runs on the test terminal concurrently with the hardware test program. This simulated operator program includes commands which simulate—a) an operator clicking a mouse on selected items in the test program image, b) an operator typing information via a keyboard into the test program, and c) an operator comparing actual test results in the test program image to predetermined expected results.

Now in the prior art, U.S. Pat. No. 5,781,720 (hereinafter Parker) teaches that an "application program", which is of the type that interacts with an operator thru a "graphical user interface", can be tested by "test script" that simulates the actions of the operator. This is illustrated in FIG. 4 of Parker wherein item 300 is the application program that is being tested; item 307 is the graphical user interface; and item 315 is the test script.

However, providing test script (or a simulated operator program) which simulates the manual actions of an operator at a graphical user interface, gives rise to two other problems. One of these problems is that errors will always occur to some degree in the simulated operator program because the simulated operator program is very large and very complex. In addition, mismatches can occur between the hardware test program and the simulated operator program as both programs are revised to make them run faster and incorporate new features.

In Parker, the handling of an error in the test scripts and/or the application program is illustrated in FIG. 5. There, box 437 is entered when an error is detected. This box 437 is described at lines 32–40 in column 14 which says:

"If the test driver, 320, is unable to execute the requested action because the timeout interval has expired, the test driver reports an error to the test executive, 317 (see box 437). Upon receiving the error report, the test executive can invoke an exception handler. The exception handler may decide either to abort further processing of the script or it may decide to clean up after the error and continue processing, giving control to the next script command after the one which produced the error."

However, the present inventor has discovered that the above error handling by Parker has some major problems. These problems and their solutions are non-obvious; and they are summarized herein by the "Brief Summary Of The Invention".

Accordingly, a primary object of the invention which is claimed herein is to provide a control program, for use in any system that includes a simulated operator program, which overcomes the above problems.

BRIEF SUMMARY OF THE INVENTION

The present invention which is claimed herein is a control program for a simulated operator program. This control program includes: a means for sequentially executing the commands in the simulated operator program; a means for displaying, on a monitor, each particular command that is currently being executed; a means for slowing the execution of the commands to a rate where each displayed command can be viewed and recognized by an operator; a means for manually stopping the simulated operator program immediately after the displayed particular command is completely executed; and a means for editing and restarting the simulated operator program at any selected command.

When the above control program is used in a system which tests the ES7000 computer hardware, the operator simply needs to watch the monitor to see each command that is simulating an operator action, and to see the test results. Watching these two items gives the operator insight on how the test is proceeding. This feature is made possible since the control program slows down the execution of each command in the simulated operator program to a rate where each displayed command can be viewed and recognized by the operator.

If the simulated operator command which is currently being executed is erroneous, that error can be seen in the command that is displayed in the monitor and recognized by the operator. For example, the operator can see a command which is causing a simulated mouse click on the wrong item in the test program image, or causing a simulated keyboard entry of the wrong information into the test program. When that occurs, the operator uses the control program to stop the simulated operator actions. Then the operator uses the control program to edit the error out of the simulated operator program, and to restart the execution of the edited simulated operator program starting at any desired command.

By comparison, in Parker, there is no control program which slows the execution of each test script down to a rate where each test script can be viewed and recognized as it is executed. Consequently, the insight which is acquired by actually seeing each test be executed is completely lost. In addition in Parker, the ability to visually recognize an error in a test script as the test script is executed doesn't exist.

Further in Parker, the ability to stop, edit errors from the test script, and restart via a control program on the test terminal simply is not possible. Any error correction, in Parker, must be done off-line; and that is a much slower process.

In addition, the control program which constitutes the present invention can be used in systems which have a simulated operator program that interacts with any type of application program. As one example, the system can include: 1) a mechanical robot which operates on a workpiece, 2) an application program which sends control signals to the robot, 3) a simulated operator program which simulates human interactions with the application program, and 4) a control program for the simulated operator program which includes a means for executing, means for displaying, means for slowing the execution, means for manually stopping, means for editing, and means for restarting as described above.

DETAILED DESCRIPTION

Figure 1:
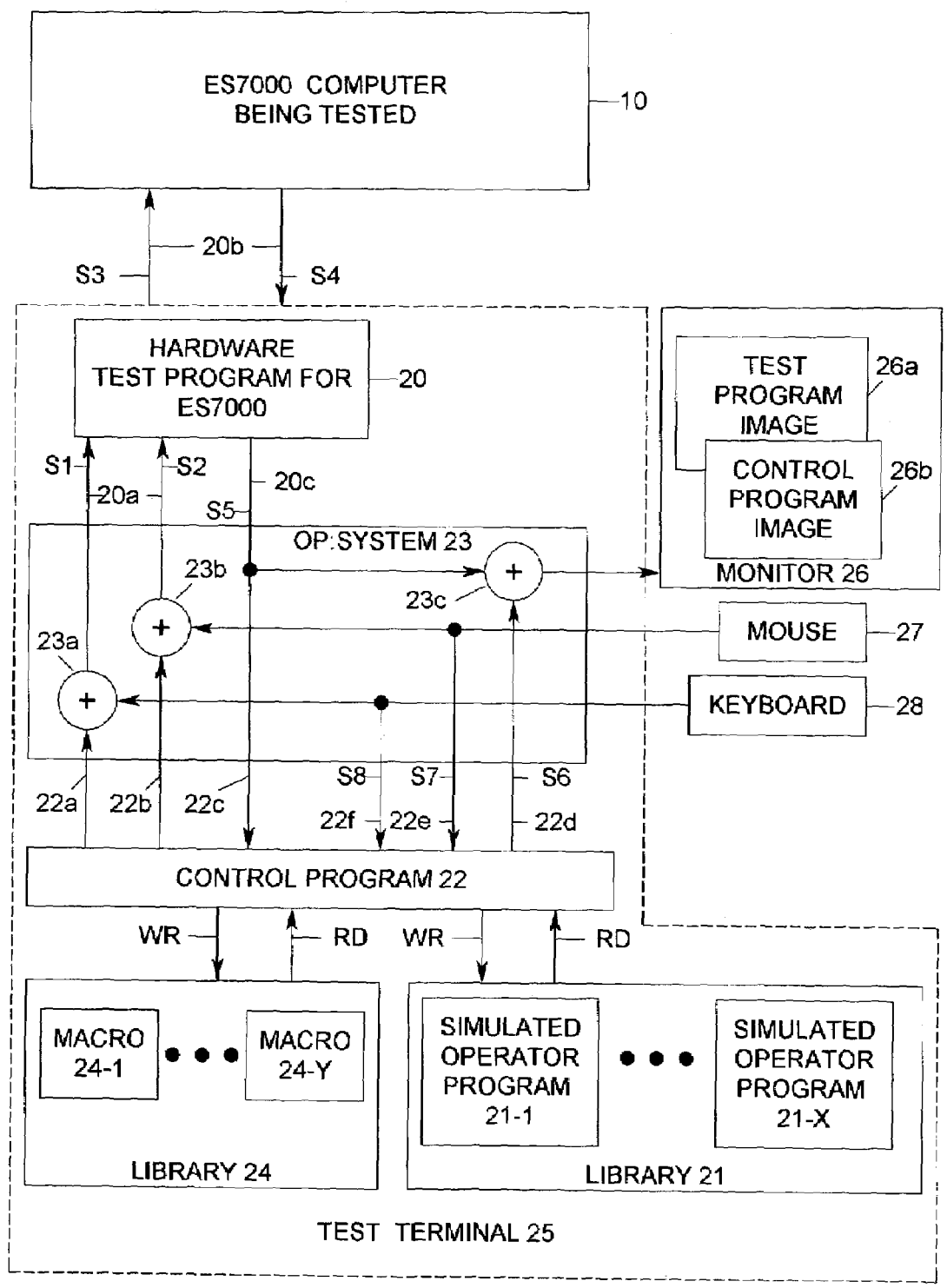
FIG. 1 shows a system, for testing the hardware of a digital computer, which constitutes one preferred embodiment of the present invention.

With reference now to FIG. 1, a system which tests the hardware of a digital computer 10, and which constitutes one preferred embodiment of the present invention, will be described. In FIG. 1, the computer 10 whose hardware is being tested is shown as an ES7000, as one example.

Included within the FIG. 1 system for testing the hardware of the computer 10 are all of the following components: 20, 21, 21-1 thru 21-$x$, 22, 23, 24, 24-1 thru 24-$y$, 25, 26, 27, and 28. These components are intercoupled as shown; and for ease of reference, they are identified below in TABLE 1.

TABLE 1

| Component | Description |
|---|---|
| 20 . . . | Component 20 is a hardware test program for the digital computer 10. |

TABLE 1-continued

| Component | Description |
|---|---|
| 21-1 thru 21-x ... | Each of the components 21-1 thru 21-x is a simulated operator program for the hardware test program 20. |
| 21 ... | Component 21 is a library which stores all of the simulated operator programs 21-1 thru 21-x. |
| 22 ... | Component 22 is a control program for the simulated operator programs 21-1 thru 21-x. This control program 22 is a key novel component in the FIG. 1 system, and its internal structure is described herein in detail in conjunction with FIGS. 2 and 3A thru 3F. |
| 23 ... | Component 23 is an operating system for all of the programs 20, 21-1 thru 21-x, and 22. |
| 24-1 thru 24-y ... | Each of the components 24-1 thru 24-y is a macro which is comprised of one or more commands; and, each of the simulated operator programs 21-1 thru 21-x is comprised of different sequences of these macros. |
| 24 ... | Component 24 is a library which stores all of the macros 24-1 thru 24-y. |
| 25 ... | Component 25 is a test terminal which stores and executes all of the programs 20, 21-1 thru 21-x, 22 and 23 concurrently. In one actual embodiment, the test terminal 20 is a Dell Optiplex computer which has 256 megabytes of memory and a Windows 2000 operating system. |
| 26, 26a, 26b ... | Component 26 is a visual monitor for the test terminal 25. This monitor displays a test program image 26a that is generated by the hardware test program 20, and a control program image 26b that is generated by the control program 22. |
| 27 ... | Component 27 is a mouse for the test terminal 25. |
| 28 ... | Component 28 is a keyboard for the test terminal 25. |

In operation, the hardware test program 20 has an input interface 20a which receives signals S1 and S2 that direct the program 20 to perform particular tests on the hardware of the computer 10. In response to the signals S1 and S2, the hardware test program 20 sends signals S3 on a test interface 20b to the computer 10; and thereafter receives signals S4 as a result. Next, the hardware test program 20 compares the received signals S4 to a predetermined result that is expected. Then the hardware test program 20 sends signals S5 on an output interface 20c which generates the test program image 26a on the monitor 26 to indicate the result of the test.

Traditionally the signals S1 and S2, which are received on the input interface 20a, are only generated manually by an operator of the test terminal 25. This is done by using the mouse 27 and the keyboard 28. But, with the system of FIG. 1, the signals S1 and S2 are also generated automatically by certain types of commands in the simulated operator programs 21-1 thru 21-x. Also traditionally, various items in the test program image 26a are visually checked by the operator of the test terminal 25. But, with the system of FIG. 1, those items are checked automatically by certain types of commands in the simulated operator programs 21-1 thru 21-x. All of the commands in the simulated operator programs 21-1 thru 21-x are executed by the control program 22.

When a first type of command from one of the simulated operator programs 21-1 thru 21-x is executed which simulates the action of an operator pressing a key on the keyboard 28, then the signals S1 are generated on output 22a of the control program 22. Those signals pass through a logical-OR 23a in the operating system 23 to the input interface 20a of the hardware test program 20. By comparison, if the key on the keyboard 28 is actually pressed, then the signals S1 are generated by the keyboard 28 and travel through the logical-OR 23a to the input interface 20a.

When a second type of command from one of the simulated operator programs 21-1 thru 21-x is executed by the control program 20 which simulates the action of an operator clicking the mouse 27, then the signals S2 are generated on output 22b of the control program 22. Those signals pass through a logical-OR 23b in the operating system 23 to the input interface 20a of the hardware test program 20. By comparison, if the mouse 27 is actually clicked, then the signals S2 are generated by the mouse 27 and travel through the logical-OR 23b to the input interface 20a.

When a third type of command from one of the simulated operator programs 21-1 thru 21-x is executed by the control program 20 which simulates the action of an operator checking the test program image 26a for a particular visual item, the flow of signals is as follows. Initially, the signals S5 which produce the test program image 26a, are sent from output 20c of the hardware test program 20 through a logical-OR 23c in the operating system 23 to the monitor 26a. In addition, the signals S5 are sent on input 22c to the control program 22. To check for a particular item in the test program image 26a, a command in one of the simulated operator programs 21-1 thru 21-x includes a bit-map which is compared to a selectable portion of the image that is formed by signals S5.

The simulated operator programs 21-1 thru 21-x also includes conventional computer commands such as a conditional branch command, a load register command, an increment/decrement register command, etc. These conventional commands are used to control the sequence in which the above described first, second, and third type commands are performed by the simulated operator programs.

In addition to executing all of the above types of commands, an important novel feature of the control program 22 is that it gives the operator of the test terminal 25 the capabilities to do all of the following: a) visually see each command which is being executed in the simulated operator program, b) stop the simulated operator program after the execution of the current command is complete, c) edit the simulated operator program while that program is stopped, and d) restart the edited simulated operator program beginning at any selectable command. These capabilities greatly decrease the time which it otherwise takes to detect and fix erroneous commands in the simulated operator program.

Figure 2:
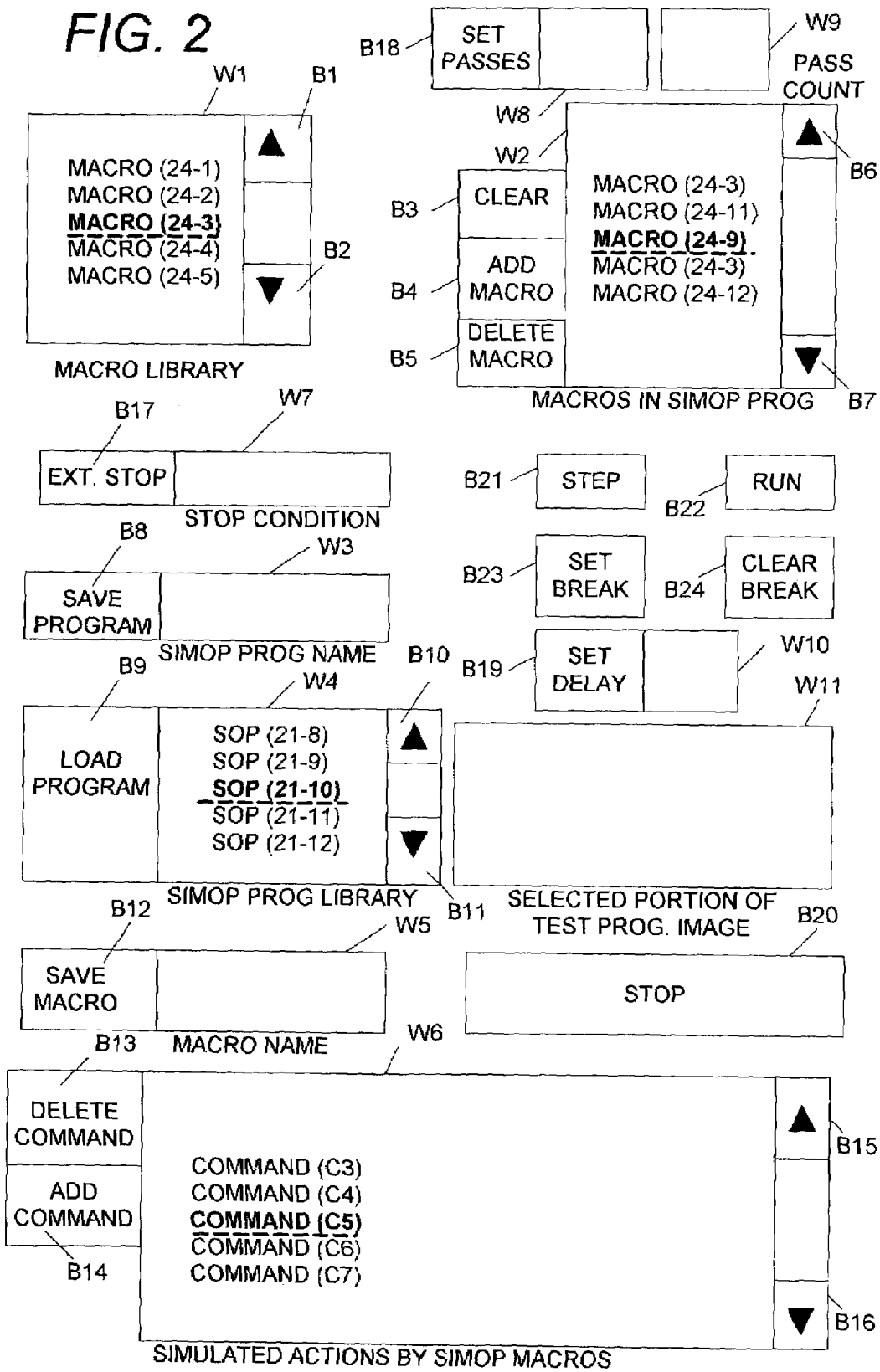
FIG. 2 shows several windows and buttons that are included within a control program image which is generated by a novel control program in the FIG. 1 system.

To achieve the above capabilities a) thru d), the control program 22 generates several windows and buttons in the control program image 26b. In FIG. 1, the control program image 26b is shown only as a labeled box due to lack of space; however, each window and button in the control program image 26*b* is shown in FIG. 2. There the windows are indicated by reference numerals W1–W11, and the buttons are indicated by reference numerals B1–B24.

All of the windows and buttons in the control program image of FIG. 2 are generated by the signals S6 from output 22*d* of the control program 22 in FIG. 1. Those signals S6 are sent through the logical-OR 23*c* in the operating system 23 to the monitor 26.

To select a particular window or button in FIG. 2, the operator clicks on that window or button with the mouse 27. That event is then sensed by the control program 22 as the signals S7 on input 22*e*. Also, to type a particular entry into the window which was last selected, the operator uses the keyboard 28. Each key which is pressed is sensed by the control program 22 as the signals S8 on input 22*f*.

For ease of reference, TABLE 2 below identifies each of the windows and buttons in the control program image of FIG. 2. This is followed by a detailed description of FIGS. 3A–3F which explains how the control program 22 and the operator of test terminal 25 interact with the windows and buttons of TABLE 2.

TABLE 2

| Component | Description |
|---|---|
| W1, B1 and B2 . . . | Component W1 is a window which displays a list of names for the macros 24-1 thru 24-y which are in the library 24. To scroll this list upward and downward, the buttons B1 and B2 are clicked with the mouse 27. The one particular macro which is in the center of the window W1 is highlighted, and this is indicated in FIG. 2 by the dashed underlining. |
| W2, B6, B7 . . . | Component W2 is a window which displays the names of the macros - a) in the order in which they occur in a selected simulated operator program, or b) in an order which can be selected by the buttons B3, B4, and B5. To scroll these macros upward and downward, the buttons B6 and B7 are clicked with the mouse 27. The macro which is in the center of the window W2 is highlighted, and this is indicated in FIG. 2 by the dashed underlining. |
| B3 . . . | Component B3 is a CLEAR button for the windows W2 and W6. When button B3 is clicked with the mouse 27, all of the macros are cleared from the window W2 and all commands are cleared from the window W6. |
| B4 . . . | Component B4 is an ADD MACRO button that is used with window W2. When button B4 is clicked with the mouse 27, any macro which is in the center of window W2 is pushed upward and the center location is filled with the macro that |

TABLE 2-continued

| Component | Description |
|---|---|
| | is highlighted in window W1. |
| B5 | Component B5 is a DELETE MACRO button that is used with window W2. When button B5 is clicked with the mouse 27, any macro which is in the center of window W2 is deleted, and all macros below that deleted macro are pushed upward. |
| W3, B8 . . . | Components W3 and B8 are used to transfer the list of macros, that are displayed in window W2, into the library 21 as one of the simulated operator programs 21-i. To cause that transfer to occur, the operator first uses the mouse 27 to click on the left side of the window W3. Next the operator uses the keyboard 28 to type a name for the simulated operator program 21-i into window W3. Then the operator uses the mouse 27 to click on the button B8. |
| W4, B10, B11 . . . | Component W4 is a window which displays a list of names for the simulated operator programs 21-1 thru 21-x which are in the library 21. To scroll this list upward and downward, the buttons B10 and B11 are pressed by clicking on them with the mouse 27. The one particular simulated operator program which is in the center of the window W4 is highlighted, and this is indicated in FIG. 2 by the dished underlining. |
| B9 . . . | Component B9 is a LOAD PROGRAM button for window W4. When button B9 is clicked with the mouse 27, the simulated operator program which is highlighted in window W4 has its macros displayed in window W2, and the commands of the first macro are displayed in windows W6. |
| W6, B15, B16 . . . | Component W6 is a window which displays a list of commands that are in the one particular macro which is on the center line of window W2. These commands are displayed in the order in which they occur within the macro. To scroll this list upward and downward, the buttons B15 and B16 are clicked with the mouse 27. The command which is the center of the window W6 is highlighted, and this is indicated in FIG. 2 by the dashed underlining. |
| B13 . . . | Component B13 is a DELETE COMMAND button for window W6. When button B13 is |

TABLE 2-continued

| Component | Description |
|---|---|
| | clicked with the mouse 27, the command which is in the center of window W6 is deleted, and all commands below the deleted command are pushed up. |
| B14 . . . | Component B14 is an ADD COMMAND button that is used to add a new command to the list which is displayed in window W6. To add that new command, the operator first uses the mouse 27 to click on the left side of the center line in window W6. In response, any command which is located on the center line in window W6 is pushed up, and the center line becomes blank. Next, the operator uses the keyboard 28 to type in the new command on the center line in window W6. Then the operator uses the mouse 27 to click on button B14. |
| W5, B12 . . . | Components W5 and B12 are used to transfer the list of commands that are displayed in window W6, into the library 24 as one particular macro 24-i. To cause that transfer to occur, the operator first uses the mouse 27 to click on the left side of window W5. Next the operator uses the keyboard 28 to type a name for the macro 24-i into window W5. Then the operator uses the mouse 27 to click on the button B12. |
| B22 . . . | Component B22 is a RUN button. When button B22 is clicked with the mouse 27, the control program 22 starts to execute one particular simulated operator program. This execution begins with the command that is displayed on the center line of window W6, which is from the macro that is displayed on the center line of window W2. |
| B20 . . . | Component B20 is a STOP button. When button B20 is clicked with the mouse 27, the control program 22 stops executing the simulated operator program that was started with the RUN button B22. |
| W10, B19 . . . | Components W10 and B19 are used to select a time delay which is automatically added, by the control program 22, to the execution of each command in the particular simulated operator program that is running. To select this delay, the operator first uses the mouse 27 to click on the left side of window W10. Next, the operator |

TABLE 2-continued

| Component | Description |
|---|---|
| | uses the keyboard 28 to type the numerical value of the delay, in seconds, into the window W10. Then the operator uses the mouse 27 to click on the button B19. |
| W8, B18 . . . | Components W8 and B18 are used to select a count which specifies the number of times that the control program 22 will automatically repeat the execution of an entire simulated operator program. To select this count, the operator first uses the mouse 27 to click on the left side of window W8. Next, the operator uses the keyboard 28 to type the numerical value of the count into window W8. Then the operator uses the mouse 27 to click on the button B18. |
| W9 . . . | Component W9 is a window which displays the number of times that the execution of the simulated operator program has been repeated. |
| B17, W7 . . . | Component B17 is a button which is used to automatically stop the execution of any simulated operator program upon the occurrence of an external condition. This button B17 has an "ON" state and an "OFF" state, and the state changes each time the button B17 is clicked with the mouse 27. If the external condition occurs when button B17 is ON, then the control program 22 stops the execution of the simulated operator program and identifies the external condition in the window W7. |
| B21 . . . | Component B21 is a STEP button. This button B21 has an "ON" state and an "OFF" state, and the state changes each time the button is clicked with the mouse 27. If the button B21 is in the ON state, then the control program 22 stops the execution of the simulated operator program after each command. |
| B23 . . . | Component B23 is a SET BREAK button which is used to set a breakpoint flag in a selected command in a simulated operator program. The particular command in which the breakpoint is set is the command that is displayed on the center line of window W6 when button B23 is clicked with the mouse 27. Thereafter, when a command which has a set breakpoint flag is executed, the control program 22 stops the |

TABLE 2-continued

| Component | Description |
|---|---|
| | execution of the next command. |
| B24 ... | Component B24 is a CLEAR BREAK button which is used to reset a breakpoint flag in a selected command in a simulated operator program. The particular command in which the breakpoint flag is reset is the command on the center line of window W6. |
| W11 ... | Component W11 is a window which displays a particular portion of the test program image 26a. |

Next, with reference to FIGS. 3A–3F, the manner in which the control program 22 interacts with all of the windows and buttons that are in TABLE 2, will be described. Initially, when the execution of the control program 22 is first started, the control program 22 performs step S1 in FIG. 3A. By that step, the control program 22 puts the control program image 26b in a predetermined initial state in which window W1 displays the names of several macros from the library 24, window W4 displays the names of several simulated operator programs from the library 21, and the remaining windows are cleared.

Figure 3A:
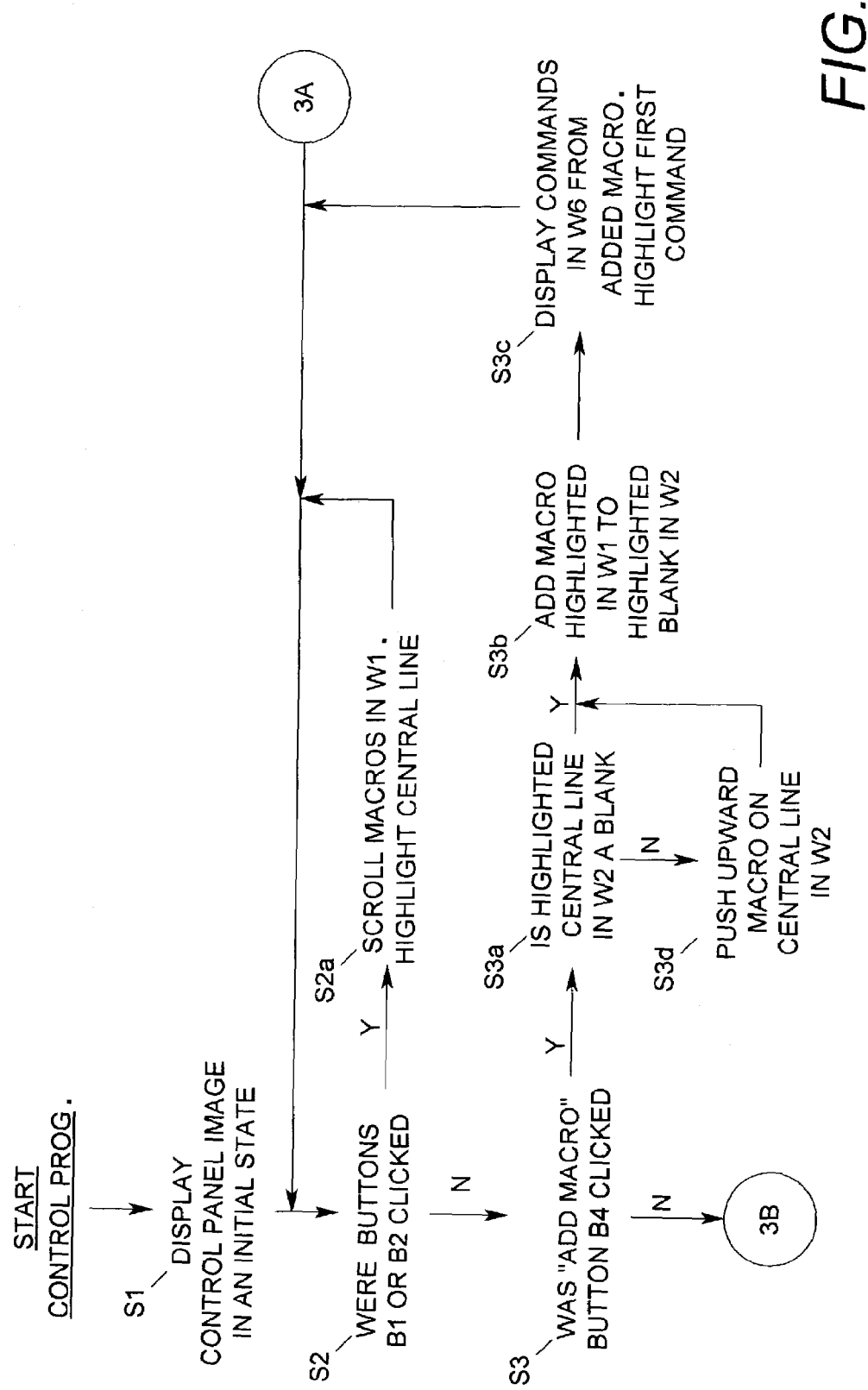
FIG. 3A shows how the control program in the FIG. 1 system interacts with one portion of the windows and buttons in the control program image of FIG. 2.
Figure 3B:
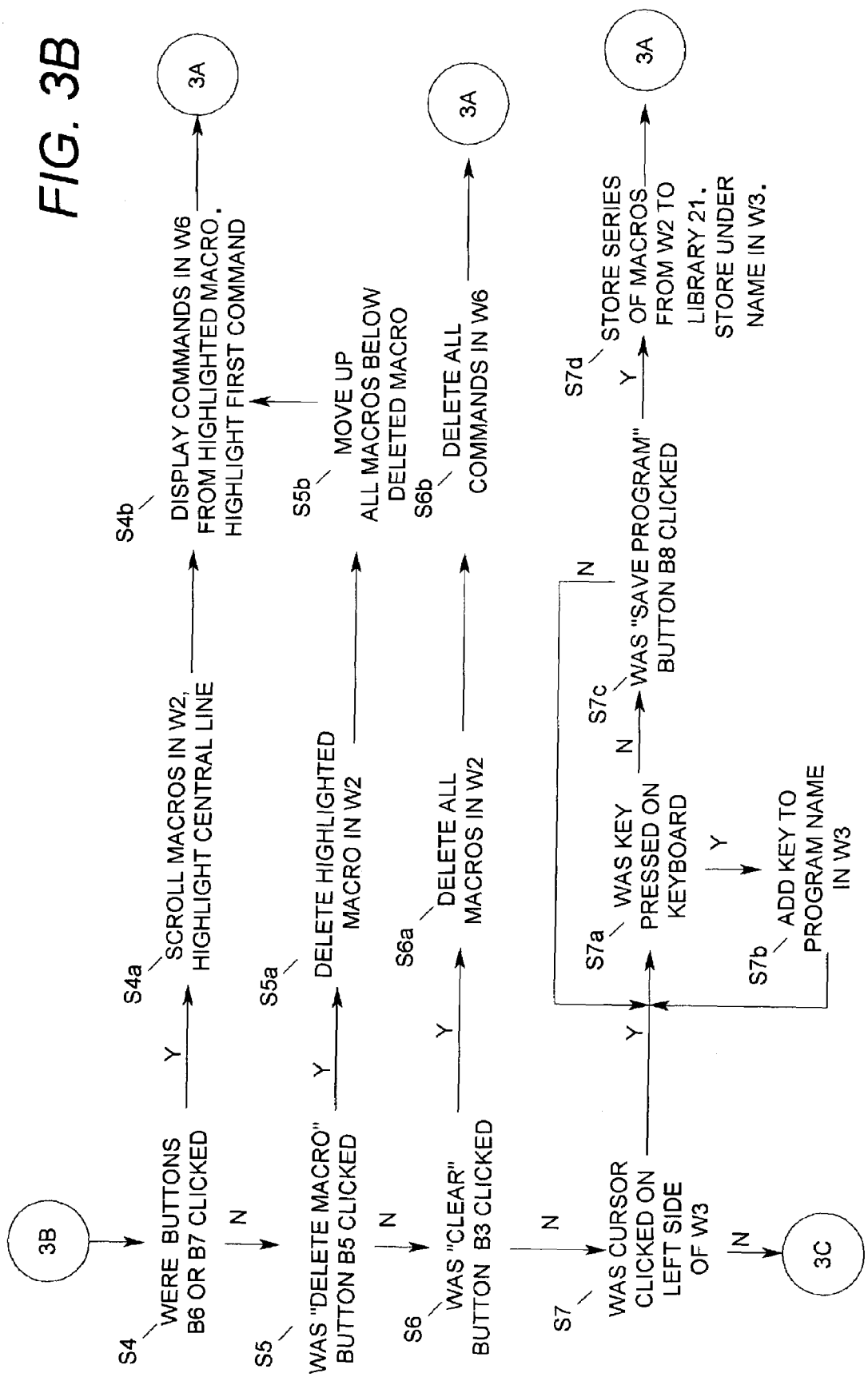
FIG. 3B shows how the control program in the FIG. 1 system interacts with a second portion of the windows and buttons in the control program image of FIG. 2.
Figure 3C:
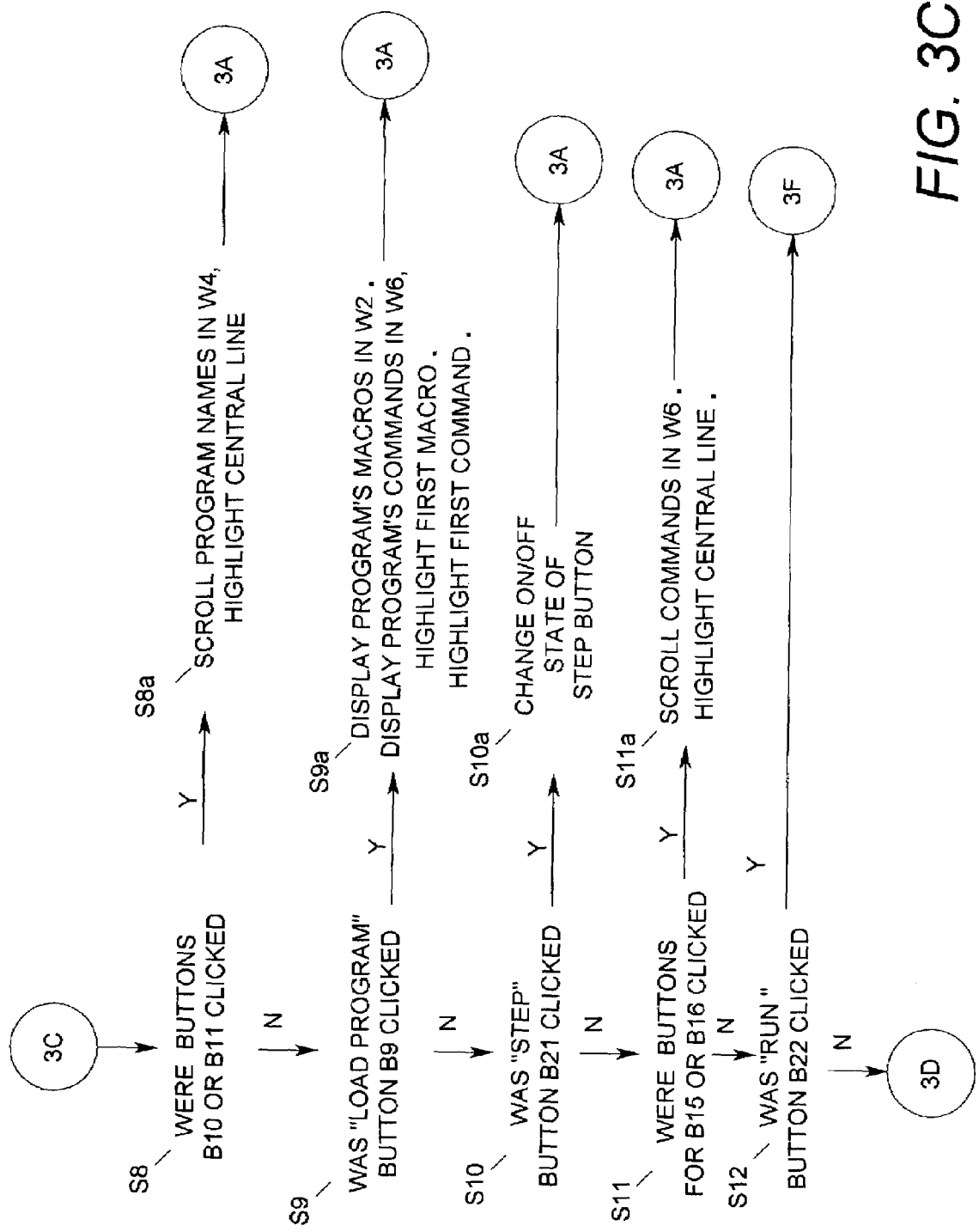
FIG. 3C shows how the control program in the FIG. 1 system interacts with a third portion of the windows and buttons in the control program image of FIG. 2.
Figure 3D:
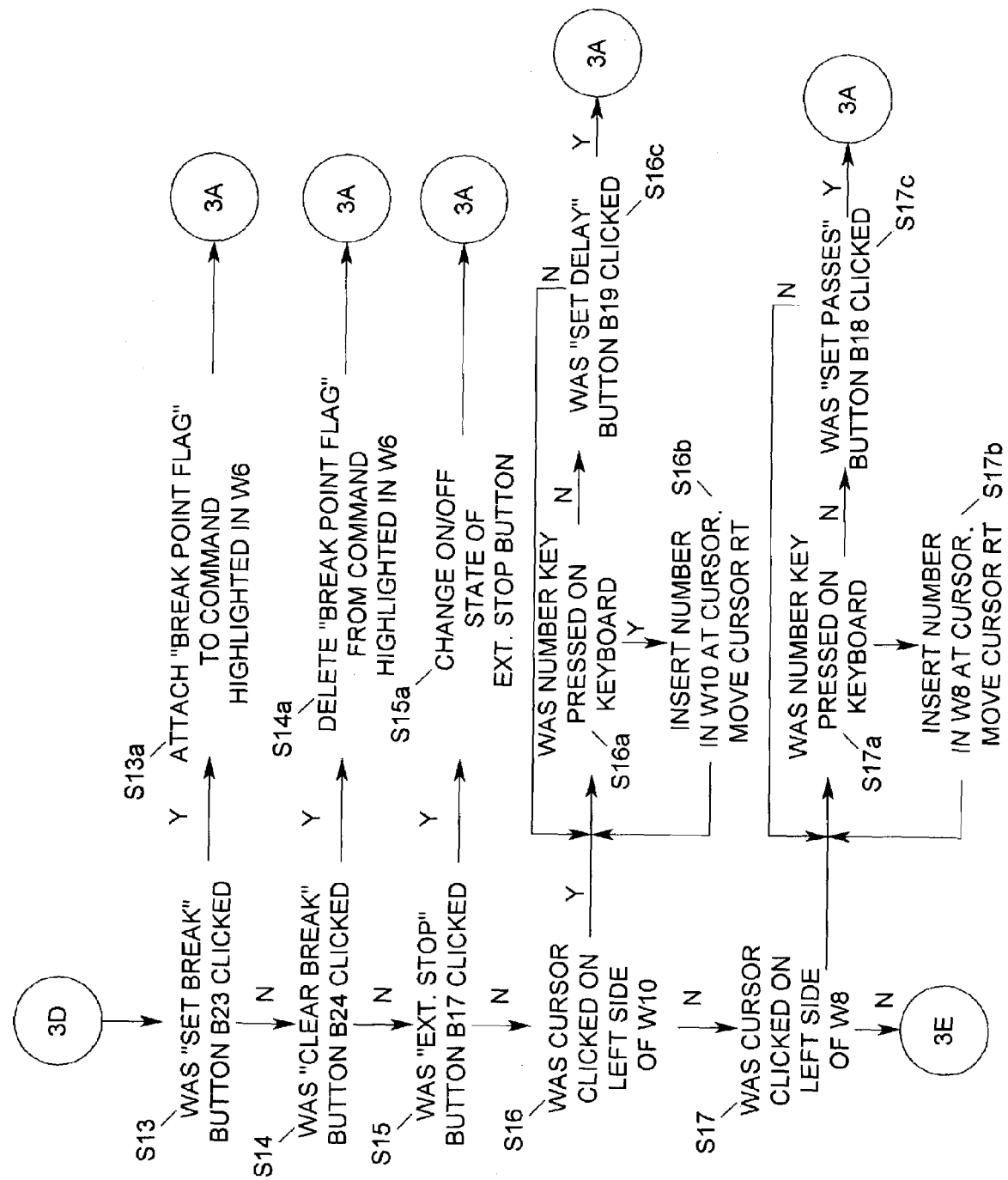
FIG. 3D shows how the control program in the FIG. 1 system interacts with a fourth portion of the windows and buttons in the control program image of FIG. 2.
Figure 3E:
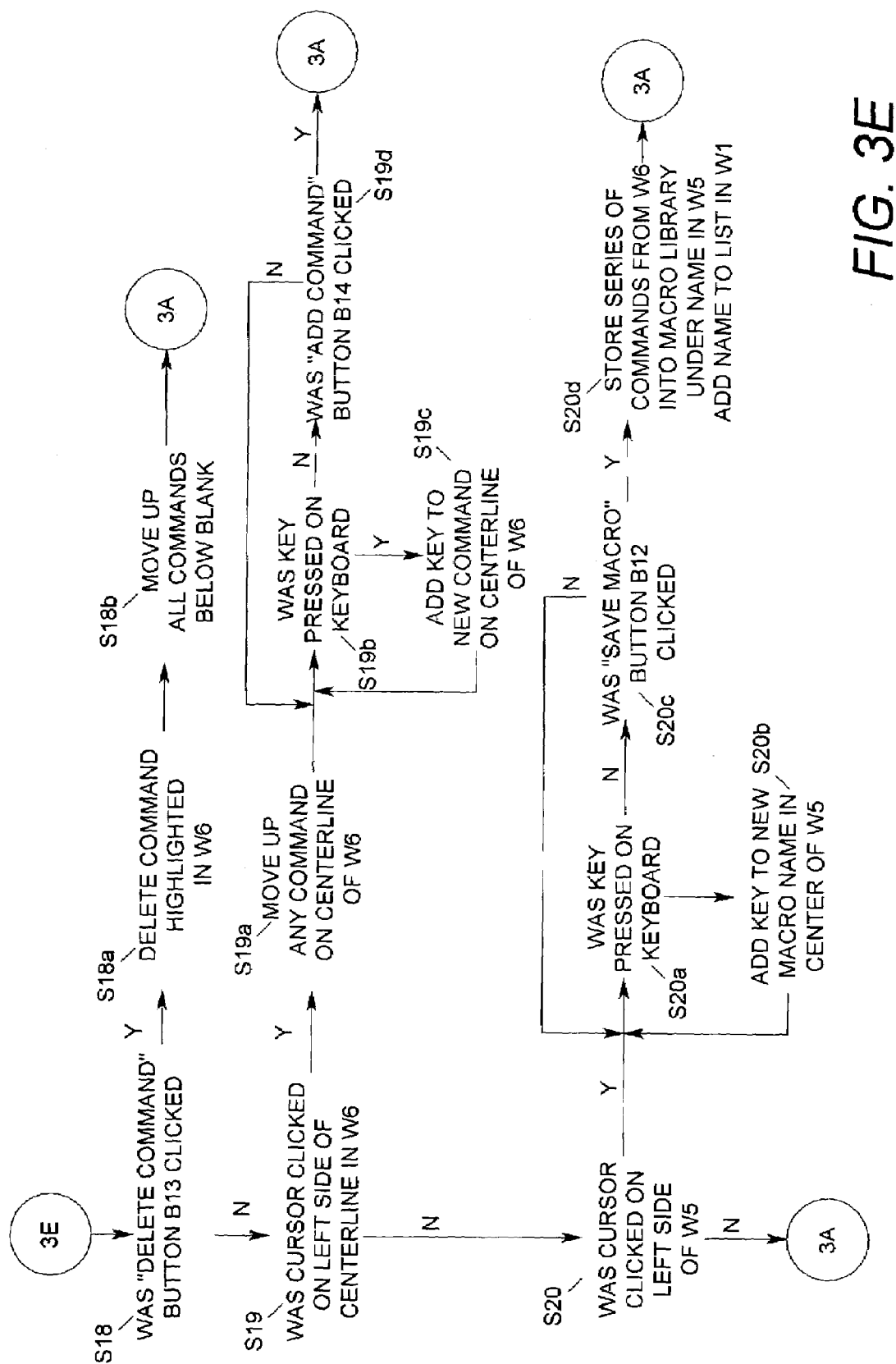
FIG. 3E shows how the control program in the FIG. 1 system interacts with a fifth portion of the windows and buttons in the control program image of FIG. 2.

Following step S1 in FIG. 3A, the control program 22 continuously detects when an operator has used the mouse 27 to click on a particular item in the control program image 26b. This detection occurs by repeatedly performing a sequence of steps S2 thru S20 in a loop. Steps S2 and S3 are shown in FIG. 3A; steps S4 thru S7 are shown in FIG. 3B; steps S8 thru S12 are shown in FIG. 3C; steps S13 thru S17 are shown in FIG. 3D; and steps S18 thru S20 are shown in FIG. 3E.

In step S2, the control program 22 checks to see if button B1 or B2 was clicked. If it was, then the control program 22 branches from step S2 to step S2a. This branch is taken only once for each time that button B1 or B2 is clicked. In step S2a, the macros in the windows W1 are scrolled upward by one macro if button B1 was clicked, and they are scrolled downward by one macro if button B2 was clicked. After this scrolling, the macro on the center line in window W1 is highlighted. Then a branch is taken back to step S2.

In step S3, the control program 22 checks to see if the ADD MACRO button B4 was clicked. If it was, then the control program 22 branches from step S3 to step S3a. This branch is taken only once for each time that button B4 is clicked. In step S3a, the control program 22 checks to see if the highlighted central line in window W2 is blank. If it is, then the control program 22a performs step S3b wherein the macro which is highlighted in window W1 is added to the blank central line in window W2. Next the control program 22 performs step S3c wherein the commands from the above added macro are displayed in window W6. The first command is highlighted and located on the center line in window W6. Then a branch is taken back to step S2.

On the other hand, if back in step S3a the highlighted central line in window W2 is not blank, then the control program 22 performs step S3d. There, the control program 22 creates a blank on the central line of window W2 by pushing upward the macro that is located on the central line.

Then, steps S3b and S3c are performed as described above.

In step S4, the control program 22 checks to see if button B6 or B7 was clicked. If it was, then the control program 22 branches from step S4 to step S4a. This branch is taken only once for each time that button B6 or B7 is clicked. In step S4a, the macros in the window W2 are scrolled upward by one macro if button B6 was clicked, and they are scrolled downward by one macro if button B7 was clicked. After this scrolling, the macro on the center line in window W2 is highlighted. Next, step S4b is performed wherein the commands from the above highlighted macro are displayed in window W6. The first command is highlighted and located on the center line in window W6. Then a branch is take back to step S2.

In step S5, the control program 22 checks to see if the DELETE MACRO button B5 was clicked. If it was, then the control program 22 branches from step S5 to step S5a. This branch is taken only one for each time that button B5 is clicked. In step S5a, the control program 22 deletes the macro which is on the central line of the window W2. Next, step S5b is performed wherein the control program 22 moves up all of the macros in window W2 which lie below the macro that was deleted in step S5a. Then step S4b is performed as previously described.

In step S6, the control program 22 checks to see if the CLEAR button B3 was clicked. If it was, then the control program 22 branches from step S6 to step S6a. This branch is taken only once for each time that button B3 is clicked. In step S6a, the control program 22 deletes all of the macros from window W2. Next, step S6b is performed wherein the control program 22 deletes all of the commands from window W6. Then a branch is taken back to step S2.

In step S7, the control program 22 checks to see if the cursor was clicked on the left side of window W3. If it was, then the control program 22 clears the window W3 and branches from step S7 to step S7a. This branch is taken only once for each time that the above cursor click occurs. In step S7a, the control program 22 checks to see if the operator pressed a key on the keyboard 28. Each time a key is pressed, then step S7b is performed wherein the key is added to the name for the simulated operator program that is being typed into window W3. After the name is typed, the operator clicks on the SAVE PROGRAM button B8. Then in response, the control program 22 performs step S7d wherein the series of macros from window W2 are stored in the library 21 under the program name that was typed in window W3. This name is also added to the list of program names that are displayed in window W4. Then a branch is taken back to step S2.

In step S8, the control program 22 checks to see if button B10 or B11 was clicked. If it was, then the control program 22 branches from step S8 to step S8a. This branch is taken only once for each time that button B10 or B11 is clicked. In step S8a, the names of the simulated operator programs which are in the library 21 are scrolled upward by one name if button B10 was clicked, and they are scrolled downward by one name if button B11 was clicked. After this scrolling, the program name on the center line in window W4 is highlighted. Then a branch is taken back to step S2.

In step S9, the control program 22 checks to see if the LOAD button B9 was clicked. If it was, then the control program 22 branches from step S9 to step S9a. This branch is taken only once for each time that button B9 is clicked. In step S9a, the control program 22 displays in window W2, the macros which are in the simulated operator program that is named on the center line of window W4. The first macro of that program is highlighted on the center line of window W2. Also, the commands of the above highlighted macro are displayed in window W6; and, the first command is highlighted on the center line of that window. Then a branch is taken back to step S2.

In step S10, the control program 22 checks to see if the STEP button B21 was clicked. If it was, then the control program 22 branches from step S10 to step S10a. This branch is taken only once for each time that button B21 is clicked. In step S10a, the control program 22 sets button B21 in an ON state if it's current state is OFF, and visa-versa. Also, the control program 22 lights the button B2 when it is in the ON state so that its state can be seen by the operator. Then a branch is taken back to step S2.

In step S81, the control program 22 checks to see if the button B15 or B16 was clicked. If it was, then the control program 22 branches from step S11 to S11a. This branch is taken only once for each time that button B15 or B16 is clicked. In step S11a, the commands in window W6 are scrolled upward by one command if button B15 was clicked, and they are scrolled downward by one command if button B16 was clicked. After this scrolling, the command on the center line in window W6 is highlighted. Then a branch is taken back to step S2.

Figure 3F:
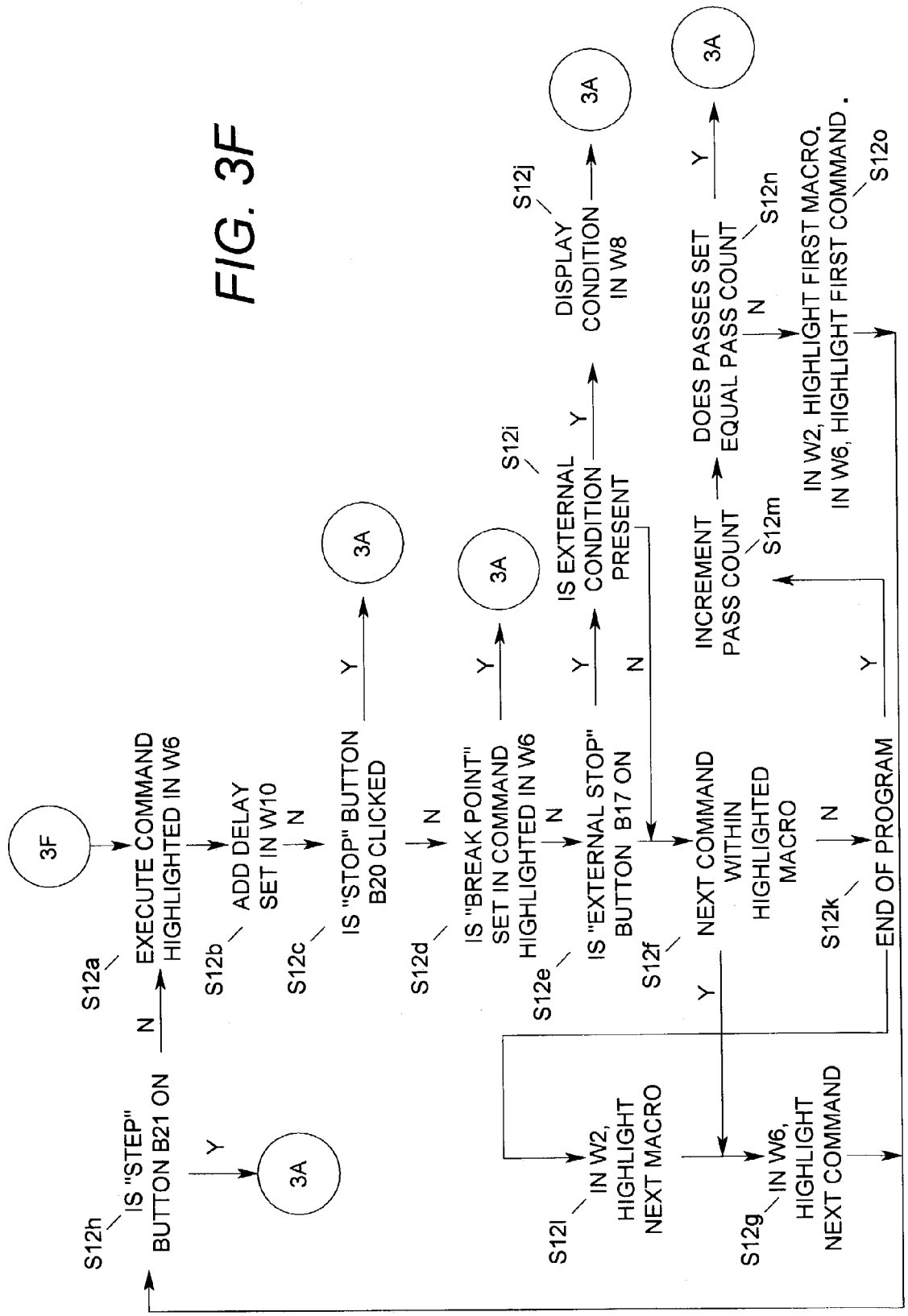
FIG. 3F shows how the control program in the FIG. 1 system interacts with a sixth portion of the windows and buttons in the control program image of FIG. 2.

In step S12, the control program 22 checks to see if the RUN button B22 was clicked. If it was, then the control program 22 branches from step S12 to step S12a of FIG. 3F. This branch is taken only once for each time that the RUN button B22 is clicked. All of the steps in FIG. 3F are described herein later in conjunction with that figure.

In step S13, the control program 22 checks to see if the SET BREAK button B23 was clicked. If it was, then the control program 22 branches from step S13 to step S13a. This branch is taken only once for each time that button B13 is clicked. In step S13a, the control program 22 sets a breakpoint flag in the command that is highlighted in window W6. This flag is a predetermined bit in the command. Then a branch is taken back to step S2.

In step S14, the control program 22 checks to see if the CLEAR BREAK button B24 was clicked. If it was, then the control program 22 branches from step S14 to step S14a. This branch is taken only once for each time that button B24 is clicked. In step S14a, the control program 22 resets a breakpoint flag in the command that is highlighted in window W6. Then a branch is taken back to step S2.

In step S15, the control program 22 checks to see if the EXTERNAL STOP button B17 was clicked. If it was, then the control program 22 branches from step S15 to step S15a. This branch is taken only once for each time that button B17 is clicked. In step S15a, the control program 22 sets button B17 in an ON state if its current state is OFF, and visa-versa. Also, the control program 22 lights the button B17 when it is in the ON state so that its state can be seen by the operator. Then a branch is take back to step S2.

In step S16, the control program 22 checks to see if the cursor was clicked on the left side of window W10. If it was, then the control program 22 clears the window W10 and branches from step S16 to step S16a. This branch is taken only once for each time that the above cursor click occurs. In step S16a, the control program 22 checks to see if the operator pressed a number key on the keyboard 28. Each time a number key is pressed, then step S16b is performed wherein the number key is entered as the right most digit of the time delay (in seconds) that is being typed into window W10. After the time delay is completely typed, the operator clicks on the SET DELAY button B19. Then a branch is taken back to step S2.

In step S17, the control program 22 checks to see if the cursor was clicked on the left side of window W8. If it was, then the control program 22 clears the window W8 and branches from step S17 to step S17a. This branch is taken only once for each time that the above cursor click occurs. In step S17a, the control program 22 checks to see if the operator pressed a number key on the keyboard 28. Each time a number key is pressed, then step S17b is performed wherein the number key is entered as the right most digit of the count that is being typed into window W8. This count specifies the number of times that the control program 22 needs to automatically repeat the execution of a selected simulated operator program. After the count is completely typed, the operator clicks on the SET PASSES button B18. Then a branch is taken back to step S2.

In step S18, the control program 22 checks to see if the DELETE COMMAND button B13 was clicked. If it was, then the control program 22 branches from step S18 to step S18a. This branch is taken only once for each time that button B13 is clicked. In step S18a, the control program 22 deletes the command which is on the central line of the window W6. Next, step S18b is performed wherein the control program 22 moves up all of the commands in window W6 which lie below the command that was deleted in step S18a. Then a branch is taken back to step S2.

In step S19, the control program 22 checks to see if the cursor was clicked on the left side of the center line in window W6. If it was, then the control program 22 branches from step S19 to step S19a. This branch is taken only once for each time that the above cursor click occurs. In step S19a, the control program 22 pushes up any command that is on the center line in window W6. This creates a blank on the center line. Then in step S19b, the control program 22 checks to see if the operator pressed a key on the keyboard 28. Each time a key is pressed, then step S19c is performed wherein the key is added to the new command that is being typed into window W6. After that new command is completely typed, the operator clicks on the ADD COMMAND button B14. Then a branch is taken back to step S2.

In step S20, the control program 22 checks to see if the cursor was clicked on the left side of window W5. If it was, then the control program 22 clears the window W5 and branches from step S20 to step S20a. This branch is taken only once for each time that the above cursor click occurs. In step S20a, the control program 22 checks to see if the operator pressed a key on the keyboard 28. Each time a key is pressed, then step S20b is performed wherein the key is added to the macro name that is being typed into window W5. After the name is completely typed, the operator clicks on the SAVE MACRO button B12. Then in response, the control program 22 performs step S20d wherein the series of commands from window W7 are stored in the library 24 under the macro name that was typed in window W5. This name is also added to the list of macro names that are displayed in window W1. Then a branch is taken back to step S2.

Next, all of the steps S12a–S12o of FIG. 3F will be described. These steps are performed by the control program 22 in response to the RUN button B22 being clicked. A branch to step 12a occurs from step S12 of FIG. 3C, as was previously described.

In step S12a, the control program 22 executes the command which is highlighted on the center line in window W6. This execution includes the substep of parsing the command to determine if simulated keyboard signals need to be generated, or if simulated mouse signals need to be generated, or if any item in the test program image needs to be checked. Thereafter, the substep of actually generating the simulated keyboard/mouse signals or actually checking an item in the test program image occurs.

In step S12b, the control program 22 waits for a certain time period, and the duration of that time period is set in the window W10. Due to this step, each command which is executed can be perceived on the center line in window W6. In addition, the two immediately preceding commands can be seen above the center line in window W6, and two immediately following commands can be seen below the center line in window W6. The time delay in step S12b can be implemented by incrementing a count in a loop until the count indicates that the desired time delay has occurred. Alternatively, the time delay can be implemented by executing an instruction which starts an external timer, and having the timer generate a signal to proceed when the desired time delay has occurred.

In step S12c, the control program 22 checks to see if the STOP button B20 was clicked. If it was, then the control program 22 branches back to step S2.

In step S12d, the control program 22 checks to see if the breakpoint flag is set in the command that was just executed in step S12a. If it is, then the control program 22 branches back to step S2.

In step S12e, the control program 22 checks to see if the EXTERNAL STOP button B17 is in the ON state. If it is, then the control program 22 performs step S12i wherein it checks to see if a predetermined external condition is present. If that condition is present, then the control program 22 performs step S12j wherein it identifies the external condition in window W8. Then the control program 22 branches back to step S2.

In step S12f, the control program 22 checks to see if the command that is to be executed next by step S12a is located within the macro that is highlighted on the center line in window W2. To perform this step, the control program 22 must take into account any branch that is specified by the command that was last executed in step S12a. If the command that is to be executed next is located within the macro that is highlighted on the center line of window W2, then the control program 22 branches to step S12g.

In step S12g, the control program 22 displays the command which is to be executed next on the center line of window W6, and that command is highlighted. Then a branch is taken to step S12h.

In step S12h, the control program 22 checks to see if the STEP button B21 is in the ON state. If it is, then a branch is taken back to step S2. Otherwise, a branch is taken back to step S12a.

Suppose now that from step 12f, the control program 22 branches to step S12k. This branch is taken if the command that is to be executed next by step S12a is not located within the macro that is highlighted in window W2. In step S12k the control program 22 checks to see if the command which is to be executed next is a stop command at the end of the simulated operator program. If it is not, then a branch is taken to step S12l.

In step S12l, the control program 22 displays on the center line of window W2, the macro which contains the command that is to be executed next; and, that macro is highlighted. Then a branch is taken to step S12g, which was described above.

Suppose now that from step S12k, the control program 22 branches to step S12m. This branch is taken if the end of the simulated operator program has been reached. In step S12m, the control program 22 adds one to the pass count in window W9. Next, in step S12n, the control program 22 checks to see if the passes set in window W8 equals the pass count in window W9. If the passes set and the pass count are equal, then a branch is taken back to step S2. Otherwise, a branch is taken to step S12o.

In step S12o, the control program 22 displays and highlights on the center line of window W2, the first macro of the simulated operator program which is being executed. Next the control program 22 displays and highlights in window W6, the first command of the macro that is on the center line of window W2. Then a branch is taken to step S12h, which was described above.

A preferred embodiment of the present invention has now been described in detail in conjunction with FIGS. 1, 2, and 3A–3F. One particular feature of this embodiment is that an operator can see each command in the simulated operator program, while the command is executed, by watching the highlighted center line in window W6. This gives the operator insight on how the execution of the simulated operator program is progressing. In addition, this helps the operator learn the various commands and macros which makeup the simulated operator program, rather than reading about them in an instruction manual.

Another feature is that an operator can see if the command which is currently being executed contains an error. If it does, the operator can respond by stopping the execution of the next command. Similarly, the operator can see if the command which is to be executed next contains an error; and if it does, the operator can respond by stopping before the erroneous command is executed.

Another feature is that when the operator detects an error and stops the execution of commands in the simulated operating program, the operator can immediately correct the error and continue running the program. To do this, the operator edits the erroneous command by using window W6, the DELETE COMMAND button B13, and the ADD COMMAND button B14, as previously described. Then the simulated operator program is restarted at any selectable point by using the SCROLL buttons B6, B7, B15, B16 and the RUN button B22.

Another feature is that the operator can easily recognize when a group of commands in a simulated operator program is being executed over and over in a loop. This event is indicated by the command which is highlighted in window W6 changing from the command that is at the end of the loop to the command that is at the start of the loop.

Another feature is that the operator can see when a group of commands, which are being executed in a loop, is taking too long to complete. If the loop of commands normally takes only a few seconds, and the operator sees that the loop of commands is still executing after a minute, the operator can stop the execution of the simulated operator program to address the problem.

Another feature is that the operator can see when a group of commands in the simulated operator program are being erroneously skipped over. This event is indicated by the command which is highlighted in window W6 changing in an erroneous non-sequential order.

Another feature is that the operator can see when the simulated operator program erroneously simulates an operator action at a speed which is too fast for the hardware test program. If that event occurs, the hardware test program will simply fail to respond to the simulated operator action.

Another feature is that the operator can see when the hardware test program has a type of error which causes it to generate a particular output too quickly. This event can be seen when the command which is highlighted in window W6 is one that waits for the particular output to occur and then branches to another command; and, the highlighted command changes too quickly.

Next, with reference to FIG. 4, a robot control system, which is a modification to the system of FIGS. 1, 2, and 3A–3F, will be described. In the FIG. 4 system, several components are the same as they are in the system of FIGS. 1, 2 and 3A–3F; and so the reference numerals of those components remain the same. Those components are the control program 22, the operating system 23, the monitor 26, the control program image 26b, the mouse 27, and the keyboard 28.

Figure 4:
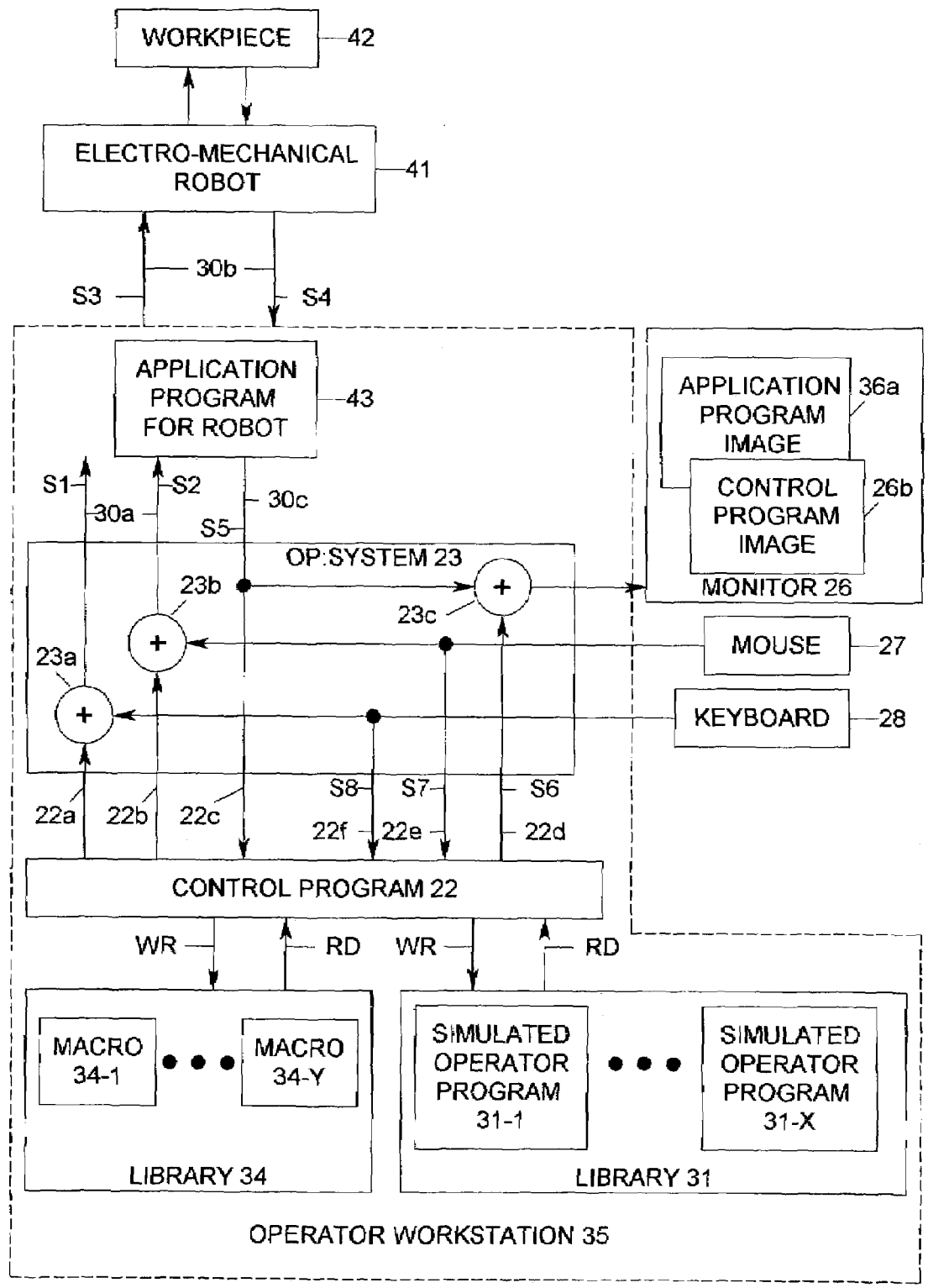
FIG. 4 shows another system which is a modification to the system of FIG. 1 and is another embodiment of the present invention.

Also in the FIG. 4 system, several components are very similar to corresponding components in the system of FIGS. 1, 2 and 3A–3F. Those components in the FIG. 4 system have the same reference numerals, plus ten, as the corresponding similar components in system of FIGS. 1, 2 and 3A–3F. For example, the macros 34-1 thru 34-y in FIG. 4 are similar to the macros 24-1 thru 24-y in FIG. 1; the simulated operator programs 31-1 thru 31-x in FIG. 4 are similar to the simulated operator programs 21-1 thru 21-y in FIG. 1; etc.

In FIG. 4, the components which are significantly different from the components in FIG. 1 are the robot 41, the workpiece 42 on which the robot performs operation, and the application program 43 for the robot. The application program 43 has input interface 30a which receives signals S1 and S2. Those signals instruct the application program 43 to make the robot 41 perform particular operations on the workpiece 43. In response to the signals S1 and S2, the application program 43 sends signals S3 on interface 30b to the robot 41; and thereafter receives signals S4 which indicate how the robot responded. Next the application program 43 compares the received signals S4 to a predetermined response that is expected. Then the application program 43 sends signals S5 on output interface 30c which generates the application program image 35a on the monitor 26 to indicate the robot's response.

Traditionally the signals S1 and S2, which are received on input interface 30a, are only generated manually by an operator of the workstation 35. This is done by using the mouse 27 and the keyboard 28. But, with the system of FIG. 4, the signals S1 and S2 are also generated automatically by certain types of commands in the simulated operator programs 31-1 thru 31-x. Also traditionally, various items in the application program image 36a are visually checked by the operator of the workstation 35. But, with the system of FIG. 4, those items are checked automatically by certain types of commands in the simulated operator programs 31-1 thru 31-x. All of the commands in the simulated operator programs 31-1 thru 31-x are executed by the control program 22, as was previously described in conjunction with FIG. 2 and FIGS. 3A–3F.

As a further modification, the control program 22 in FIGS. 1, 2, 3A–3F and 4 can be used in systems which have a simulated operator program that interacts with any type of application program. The hardware test system of FIG. 1 and the robot control system of FIG. 4 are only two specific examples of these systems. Another specific example is a system which includes: 1) an electromechanical apparatus which tests integrated circuit chips, 2) an application program which sends control signals to the chip testing apparatus, 3) a simulated operator program which simulates human interactions with the application program, and 4) the control program 22 for the simulated operator program, as described above.

As another modification, all of the commands in the simulated operator programs 21-1 thru 21-x can have any format, as desired. For example, each command can include an operation code which indicates that the command: a) simulates an operator pressing a key on the keyboard, or b) simulates an operator clicking the mouse, or c) simulates an operator checking the test program image 26a for a particular visual item, or d) is a conventional computer command. Also each command can include one or more fields which specify any details that are needed to perform the action which is indicated by the operation code. For example, if the operation code indicates that the command simulates an operator pressing a key, then a field can be included which specifies the particular key that is pressed.

As another modification, the command which simulates the action of an operator checking the test program image 26a for a particular visual item, need not always include a bit-map to specify that item. In particular, if the operating system tracks the state of certain items in the test program image 26a, then the command can simply call the operating system and ask for the state of any item which the operating system tracks.

As another modification, step S12a of FIG. 3F can be moved to occur between steps S12c and S12d. By this modification, the time delay in step S12b, and the sensing of the STOP button in step S12c, occur before the highlighted command in window W6 is executed. Thus, if the highlighted command contains an error, the simulated operator program can be stopped before the highlighted command is executed.

As another modification, step S12n of FIG. 3F can be changed such that the "passes set" is compared to the "pass count" as shown only if the "passes set" is not zero. If the "passes set" is zero, then the branch to step S12o can always occur; and, that would enable the simulated operator program to be executed over and over until stopped by the STOP button B20.

Accordingly, it is to be understood that the present invention is not limited to all of the details of any one particular system which was described above, but is defined by the appended claims.

What is claimed is:

1. A program storage device, readable: by a computer, which embodies a control program for said computer; said control program comprising:

a means for sequentially executing a series of commands, in a simulated operator program, that simulate an operator sending a signal from a keyboard to an application program, simulate said operator sending a signal from a mouse to said application program, and simulate said operator comparing an image from said application program to a predetermined image;

a means for generating a control program image on a monitor which displays a set of control items and concurrently displays each particular command in said series that is currently being executed;

a means for adding a time delay to the execution of each and every command in said series which is so long that each displayed particular command can be viewed by said operator as said particular command is being executed; and, a means for stopping the execution of said commands, immediately after the displayed particular command is completely executed, in response to said operator sending a signal via a predetermined one of said control items.

2. A program storage device according to claim 1 wherein said control program further includes a means for setting a duration for said time delay in response to said operator sending signals via a first subset of said control items in said control program image.

3. A program storage device according to claim 1 wherein said control program further includes a means for setting a duration for said time delay in response to particular commands in said simulated operator program which have a predetermined format.

4. A program storage device according to claim 1 wherein said control program further includes a means for limiting the execution of said commands to a rate which does not exceed five commands per second.

5. A program storage device according to claim 1 wherein said control program further includes a means for adding said time delay by executing a timing loop after the execution of each command.

6. A program storage device according to claim 1 wherein said control program further includes a means for adding said time delay by receiving a periodic interrupt signal from an external timer, and executing a single one of said commands in response to each interrupt signal.

7. A program storage device according to claim 1 wherein said control program further includes a means for partitioning said simulated operator program into a sequence of macros, with each macro being a subset of said series of commands; and, a means for displaying in said control program image a contiguous group of said macros which include said particular command that is currently being executed.

8. A program storage device according to claim 7 wherein said control program further includes a means for modifying said sequence of macros in response to said operator sending signals via a first subset of said control items in said control program image, while the execution of said commands is stopped.

9. A program storage device according to claim 8 wherein said control program further includes a means for executing the modified sequence of macros, beginning with any one selected macro, in response to said operator sending signals via a second subset of said control items in said control program image.

10. A program storage device according to claim 8 wherein said control program further includes a means for selecting any one macro from a library of macros and inserting said one macro after any other selected macro in said sequence, in response to said operator sending signals via a second subset of said control items in said control program image, while the execution of said commands is stopped.

11. A program storage device according to claim 8 wherein said control program further includes a means for selecting and deleting any one macro from said sequence, in response to said operator sending signals via a second subset of said control items in said control program image, while the execution of said commands is stopped.

12. A program storage device according to claim 8 wherein said control program further includes a means for selecting and modifying any one command, within any one macro, in response to said operator sending signals via a second subset of said control items in said control program image, while the execution of said commands is stopped.

13. A program storage device according to claim 1 wherein said control program further includes a means for displaying a contiguous group of commands, in said control program image, which includes said particular command that is currently being executed and the next command in said series.

14. A program storage device according to claim 13 wherein said control program further includes a means for selecting and changing any one command in said contiguous group of commands, in response to said operator sending signals via a first subset of said control items in said control program image, while the execution of said commands is stopped.

15. A program storage device according to claim 14 wherein said control program further includes a means for executing the changed sequence of commands, beginning with any selected command, in response said to operator sending signals via a second subset of said control items in said control program image.

* * * * *